United States Patent
Li

(10) Patent No.: US 10,869,171 B2
(45) Date of Patent: Dec. 15, 2020

(54) DEVICE-TO-DEVICE D2D SERVICE TRANSMISSION METHOD, APPARATUS, AND DEVICE

(71) Applicant: Huawei Technologies Co., Ltd., Shenzhen (CN)

(72) Inventor: Mingchao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/906,134

(22) Filed: Feb. 27, 2018

(65) Prior Publication Data

US 2018/0184273 A1 Jun. 28, 2018

Related U.S. Application Data

(63) Continuation of application No. PCT/CN2015/088640, filed on Aug. 31, 2015.

(51) Int. Cl.
*H04W 4/46* (2018.01)
*H04W 16/14* (2009.01)
(Continued)

(52) U.S. Cl.
CPC ............. *H04W 4/46* (2018.02); *H04W 16/14* (2013.01); *H04W 48/10* (2013.01);
(Continued)

(58) Field of Classification Search
CPC ....... H04W 16/14; H04W 48/10; H04W 4/46; H04W 72/0453; H04W 72/048;
(Continued)

(56) References Cited

U.S. PATENT DOCUMENTS

2013/0273926 A1 10/2013 Peng et al.
2015/0016357 A1 1/2015 Yie et al.
(Continued)

FOREIGN PATENT DOCUMENTS

CN 102244873 A 11/2011
CN 103238360 A 8/2013
(Continued)

OTHER PUBLICATIONS

3rd Generation Partnership Project; Technical Specification Group Radio Access Network; Evolved Universal Terrestrial Radio Access (E-UTRA); User Equipment (UE) procedures in idle mode (Release 12), 3GPP TS 36.304 V12.5.0 (Jun. 2015), 38 pages.
(Continued)

*Primary Examiner* — Awet Haile
(74) *Attorney, Agent, or Firm* — Slater Matsil, LLP

(57) ABSTRACT

A method is provided. The method includes obtaining, by UE, signal quality of a first cell operating on a first transmission carrier frequency. When the UE determines that the signal quality of the first cell is higher than a preset threshold, and the UE receives first indication information sent by the first cell, the method includes selecting, by the UE, the first cell as a serving cell, where the first indication information indicates that the first cell can control the UE to transmit device-to-device D2D service data on a second transmission carrier frequency, and the first transmission carrier frequency and the second transmission carrier frequency are located at different frequencies.

18 Claims, 3 Drawing Sheets

(51) Int. Cl.
*H04W 48/10* (2009.01)
*H04W 72/04* (2009.01)
*H04W 72/08* (2009.01)
*H04W 72/12* (2009.01)

(52) U.S. Cl.
CPC ..... *H04W 72/048* (2013.01); *H04W 72/0453* (2013.01); *H04W 72/085* (2013.01); *H04W 72/1215* (2013.01)

(58) Field of Classification Search
CPC ........... H04W 72/085; H04W 72/1215; H04W 72/042; H04W 72/082; H04W 4/005; H04W 92/18; H04W 4/70; H04W 52/383; H04W 72/04; H04W 72/0493; H04W 72/08; H04W 76/27; H04B 17/318
See application file for complete search history.

(56) References Cited

U.S. PATENT DOCUMENTS

| | | | |
|---|---|---|---|
| 2015/0117239 A1 | 4/2015 | Lindoff et al. | |
| 2015/0163770 A1 | 6/2015 | Guo et al. | |
| 2015/0296469 A1* | 10/2015 | Yoon | H04W 76/14 370/350 |
| 2015/0373719 A1 | 12/2015 | Xu et al. | |
| 2016/0007372 A1 | 1/2016 | Fujishiro et al. | |
| 2016/0037399 A1* | 2/2016 | Li | H04W 36/0061 455/436 |
| 2016/0112858 A1* | 4/2016 | Nguyen | H04W 8/005 370/329 |
| 2016/0135121 A1 | 5/2016 | Takano et al. | |
| 2016/0205534 A1* | 7/2016 | Fujishiro | H04L 5/0062 455/434 |
| 2016/0212665 A1* | 7/2016 | Fukuta | H04W 76/14 |
| 2016/0337839 A1 | 11/2016 | Chae et al. | |

FOREIGN PATENT DOCUMENTS

| | | |
|---|---|---|
| CN | 103415022 A | 11/2013 |
| CN | 103442442 A | 12/2013 |
| CN | 103581919 A | 2/2014 |
| CN | 103634852 A | 3/2014 |
| CN | 104335657 A | 2/2015 |
| CN | 105208664 A | 12/2015 |
| EP | 3065463 A1 | 9/2016 |
| WO | 2014121641 A1 | 8/2014 |
| WO | 2014129465 A1 | 8/2014 |
| WO | 2015015924 A1 | 2/2015 |
| WO | 2015053382 A1 | 4/2015 |
| WO | 2015065106 A1 | 5/2015 |
| WO | 2015115793 A1 | 8/2015 |

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 12), 3GPP TS 36.331 V12.6.0 (Jun. 2015), 449 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), 3GPP TS 36.300 V13.0.0 (Jun. 2015), 254 pages.

3rd Generation Partnership Project; Technical Specification Group Radio Access Network;Evolved Universal Terrestrial Radio Access (E-UTRA); Requirements for support of radio resource management (Release 13), 3GPP TS 36.133 V13.0.0 (Jul. 2015), 1412 pages.

* cited by examiner

DEVICE-TO-DEVICE D2D SERVICE TRANSMISSION METHOD, APPARATUS, AND DEVICE

CROSS-REFERENCE TO RELATED APPLICATIONS

This application is a continuation of International Application No. PCT/CN2015/088640, filed on Aug. 31, 2015, the disclosure of which is hereby incorporated by reference in its entirety.

TECHNICAL FIELD

The present invention relates to the field of communications technologies, and in particular, to a D2D service transmission method, apparatus, and device.

BACKGROUND

Currently, a Long Term Evolution (LTE) communications system is a relatively mainstream wireless communications technology. A device-to-device (D2D) technology is used as an important feature in 3GPP LTE Release 12 and is standardized. D2D supports direct communication between user terminals (User Equipment, UE). Usually, a cell (referred to as a serving cell) providing a service for the UE can schedule a resource used for a D2D service only when a transmission carrier frequency of the serving cell selected by the UE and a transmission carrier frequency of the D2D service are located at a same frequency. Correspondingly, when the transmission carrier frequency of the serving cell selected by the UE and the transmission carrier frequency of the D2D service are located at different frequencies, the serving cell cannot provide D2D service transmission for the UE.

An application scenario of performing D2D service transmission when the transmission carrier frequency of the serving cell selected by the UE and the transmission carrier frequency of the D2D service are located at different frequencies is vehicle to vehicle (V2V) communication.

With continuous development of society, an intelligent transportation system advances continuously. A vehicle can obtain road status information or receive an information service in time by using V2V. As shown in FIG. 1, a vehicle may broadcast information, such as a speed of the vehicle, a traveling direction, a specific location, and whether emergency braking is performed, to a surrounding vehicle by using the V2V communication. By obtaining such information, a driver can better perceive a traffic status beyond a line of sight, so as to anticipate a danger and then dodge the danger. Information transmitted in a V2V communications system is referred to as V2V information. In the V2V communications system, a vehicle sends the V2V information to a surrounding vehicle in a broadcasting manner. A sending period is usually 1 to 10 Hz, and a volume of the V2V information approximately varies from 50 to 1200 bytes.

A V2V communication scenario also belongs to direct communication between user terminals. Therefore, a V2V service may be transmitted using a D2D technology. However, a V2V service-specific transmission frequency may be different from a frequency of a current serving cell. In this case, an LTE-based Internet of Vehicles solution is as follows. A base station sends, to UE using a current serving cell of the UE, configuration information of a dedicated transmission carrier frequency for transmitting a V2V service. The UE sends a V2V service on the dedicated transmission carrier frequency according to the configuration information by using the D2D technology.

Usually, the cell providing the service for the UE can schedule the resource used for the D2D service only when the transmission carrier frequency of the serving cell selected by the UE and the transmission carrier frequency for the D2D service are located at a same frequency. However, in an LTE-based V2V communication scenario, a V2V-specific transmission carrier frequency and an LTE control carrier frequency are located at two different frequencies. An existing mechanism for cell selection in the D2D service does not support resource allocation for the V2V-specific transmission carrier frequency by using the LTE control carrier frequency.

SUMMARY

Embodiments provide a D2D service transmission method, apparatus, and device, to resolve a problem that a terminal cannot select a transmission carrier frequency located at a different frequency to transmit D2D service data.

According to a first aspect, a device-to-device (D2D) service transmission method is provided. The method includes obtaining, by UE, signal quality of a first cell operating on a first transmission carrier frequency. When the UE determines that the signal quality of the first cell is higher than a preset threshold, and the UE receives first indication information sent by the first cell, the method also includes selecting, by the UE, the first cell as a serving cell. The first indication information indicates that the first cell can control the UE to transmit device-to-device D2D service data on a second transmission carrier frequency, and the first transmission carrier frequency and the second transmission carrier frequency are located at different frequencies. The method also includes transmitting, by the UE, the D2D service data on the second transmission carrier frequency.

With reference to the first aspect, in a first possible implementation of the first aspect, that the UE receives first indication information sent by the first cell includes: the UE receives the first indication information that is sent by the first cell by broadcasting system information; or the UE receives the first indication information that is sent by the first cell by using radio resource control RRC-specific control signaling.

With reference to the first aspect or the first possible implementation of the first aspect, in a second possible implementation of the first aspect, before the UE receives the first indication information sent by the first cell, the method further includes: sending, by the UE to the first cell, a request message including frequency information of a transmission carrier frequency for a D2D service in which the UE is interested, so that the first cell sends the first indication information according to the request message.

With reference to any one of the first aspect or the first to the second possible implementations of the first aspect, in a third possible implementation of the first aspect, the first indication information includes frequency information of a frequency of at least one second transmission carrier frequency.

With reference to the second or the third possible implementation of the first aspect, in a fourth possible implementation of the first aspect, a frequency of the second transmission carrier frequency is included in the request message.

With reference to any one of the first aspect or the first to the fourth possible implementations of the first aspect, in a fifth possible implementation of the first aspect, after the UE transmits a D2D service on the second transmission carrier frequency, the method further includes: sending, by the UE to the first cell, a notification message including frequency information of the second transmission carrier frequency. The notification message is used to inform the first cell that the UE uses the second transmission carrier frequency as a transmission carrier frequency for transmitting the D2D service.

With reference to any one of the first aspect or the first to the third possible implementations of the first aspect, in a sixth possible implementation of the first aspect, after the UE transmits the D2D service on the second transmission carrier frequency, the method further includes: performing, by the UE, frequency scanning on a third transmission carrier frequency, to determine a second cell; when the second cell meets a specified condition, reselecting, by the UE, the second cell as the serving cell; and transmitting, by the UE, D2D service data on a transmission carrier frequency that is used to execute a D2D service and that can be controlled by the second cell.

With reference to the sixth possible implementation of the first aspect, in a seventh possible implementation of the first aspect, the specified condition includes at least one of the following: signal quality of the second cell is higher than or equal to a reselection threshold, and the UE can receive a second indication message sent by the second cell, where the second indication message indicates that the second cell can control the UE to transmit the D2D service data on the second transmission carrier frequency; the signal quality of the first cell is lower than an access threshold, signal quality of the second cell is higher than or equal to a reselection threshold, and the UE can receive a second indication message sent by the second cell, where the second indication message indicates that the second cell can control the UE to transmit the D2D service data on the second transmission carrier frequency; or the signal quality of the first cell is lower than an access threshold, signal quality of the second cell is higher than or equal to a reselection threshold, and the UE can receive a third indication message sent by the second cell, where the third indication message indicates that the second cell can control the UE to transmit the D2D service data on the third transmission carrier frequency.

With reference to the sixth possible implementation of the first aspect, in an eighth possible implementation of the first aspect, the first indication information further includes an access priority of a transmission carrier frequency used for transmitting the D2D service. The specified condition includes at least one of the following: signal quality of the second cell is higher than or equal to a reselection threshold, the UE can receive a third indication message sent by the second cell, and an access priority of the third transmission carrier frequency is higher than that of the second transmission carrier frequency, where the third indication message indicates that the second cell can control the UE to transmit the D2D service data on the third transmission carrier frequency; or the signal quality of the first cell is lower than an access threshold, signal quality of the second cell is higher than or equal to a reselection threshold, the UE can receive a third indication message sent by the second cell, and an access priority of the third transmission carrier frequency is higher than that of the second transmission carrier frequency, where the third indication message indicates that the second cell can control the UE to transmit the D2D service data on the third transmission carrier frequency.

With reference to the sixth possible implementation of the first aspect, in a ninth possible implementation of the first aspect, the first indication information further includes a cell reselection priority. The specified condition includes at least one of the following: signal quality of the second cell is higher than or equal to a reselection threshold, a reselection priority of the second cell is higher than or equal to that of the first cell, and the UE can receive a second indication message sent by the second cell, where the second indication message indicates that the second cell can control the UE to transmit the D2D service data on the second transmission carrier frequency; or signal quality of the second cell is higher than the signal quality of the first cell, a reselection priority of the second cell is higher than or equal to that of the first cell, and the UE can receive a second indication message sent by the second cell, where the second indication message indicates that the second cell can control the UE to transmit the D2D service data on the second transmission carrier frequency.

According to a second aspect, a device-to-device D2D service transmission method is provided. The method includes sending, by a first cell, first indication information using a first transmission carrier frequency. The first indication information indicate that the first cell can control UE to transmit device-to-device (D2D) service data on a second transmission carrier frequency. The UE determines, according to the indication information, to use the first cell as a serving cell and transmit the D2D service data on the second transmission carrier frequency. The first transmission carrier frequency and the second transmission carrier frequency are located at different frequencies.

With reference to the second aspect, in a first possible implementation of the second aspect, the method further includes: when the first cell determines that the UE transmits the D2D service data on the second transmission carrier frequency, allocating, by the first cell, a D2D transmission resource on the second transmission carrier frequency to the UE.

With reference to the second aspect or the first possible implementation of the second aspect, in a second possible implementation of the second aspect, sending, by the first cell, first indication information using a first transmission carrier frequency includes: sending, by the first cell, the indication information by broadcasting system information; or sending, by the first cell, the first indication information by using radio resource control RRC-specific control signaling.

With reference to any one of the second aspect or the first to the second possible implementations of the second aspect, in a third possible implementation of the second aspect, before the sending, by a first cell, first indication information using a first transmission carrier frequency, the method further includes: receiving, by the first cell, a request message sent by the UE. The request message includes frequency information of a transmission carrier frequency for a D2D service in which the UE is interested. The method also includes sending, by the first cell, the first indication information according to the request message.

With reference to any one of the second aspect or the first to the third possible implementations of the second aspect, in a fourth possible implementation of the second aspect, the first indication information that is sent by the first cell using the first transmission carrier frequency includes frequency information of at least one second transmission carrier frequency.

With reference to the fourth possible implementation of the second aspect, in a fifth possible implementation of the second aspect, frequency information that is of the second transmission carrier frequency and that is in the first indication information sent by the first cell is included in the request message.

With reference to any one of the second aspect or the first to the fifth possible implementations of the second aspect, in a sixth possible implementation of the second aspect, the method further includes: receiving, by the first cell, a notification message that includes the frequency information of the second transmission carrier frequency and that is sent by the UE. The notification message informs the first cell that the UE uses the second transmission carrier frequency as a transmission carrier frequency for transmitting the D2D service data.

According to a third aspect, a device-to-device (D2D) service transmission apparatus is provided. The apparatus includes an obtaining module, configured to obtain signal quality of a first cell operating on a first transmission carrier frequency. The apparatus also includes a receiving module, configured to receive first indication information sent by the first cell. The apparatus also includes a selection module, configured to, when it is determined that the signal quality of the first cell is higher than a preset threshold, and the first indication information sent by the first cell is received, select the first cell as a serving cell. The first indication information indicates that the first cell can control UE to transmit device-to-device D2D service data on a second transmission carrier frequency, and the first transmission carrier frequency and the second transmission carrier frequency are located at different frequencies. The apparatus also includes an execution module, configured to transmit the D2D service data on the second transmission carrier frequency.

With reference to the third aspect, in a first possible implementation of the third aspect, the receiving module is configured to receive the first indication information that is sent by the first cell by broadcasting system information, or receive the first indication information that is sent by the first cell using radio resource control (RRC)-specific control signaling.

With reference to the third aspect or the first possible implementation of the third aspect, in a second possible implementation of the third aspect, the apparatus further includes a first sending module, configured to send, to the first cell, a request message including frequency information of a transmission carrier frequency for a D2D service in which the UE is interested. The first cell sends the first indication information according to the request message.

With reference to any one of the third aspect or the first to the second possible implementations of the third aspect, in a third possible implementation of the third aspect, the first indication information received by the receiving module includes frequency information of a frequency of at least one second transmission carrier frequency.

With reference to the second or the third possible implementation of the third aspect, in a fourth possible implementation of the third aspect, a frequency of the second transmission carrier frequency selected by the selection module is included in the request message.

With reference to any one of the third aspect or the first to the fourth possible implementations of the third aspect, in a fifth possible implementation of the third aspect, a second sending module is configured to send, to the first cell, a notification message including frequency information of the second transmission carrier frequency. The notification message informs the first cell that the UE uses the second transmission carrier frequency as a transmission carrier frequency for transmitting the D2D service.

With reference to any one of the third aspect or the first to the third possible implementations of the third aspect, in a sixth possible implementation of the third aspect, the apparatus further includes: a determining module, configured to perform frequency scanning on a third transmission carrier frequency, to determine a second cell. The apparatus also includes a reselection module, configured to: when the second cell meets a specified condition, reselect the second cell as the serving cell. The apparatus also includes a transmission module, configured to transmit D2D service data on a transmission carrier frequency that is used to execute a D2D service and that can be controlled by the second cell.

With reference to the sixth possible implementation of the third aspect, in a seventh possible implementation of the third aspect, the specified condition determined by the reselection module includes at least one of the following: signal quality of the second cell is higher than or equal to a reselection threshold, and the UE can receive a second indication message sent by the second cell, where the second indication message indicates that the second cell can control the UE to transmit the D2D service data on the second transmission carrier frequency; the signal quality of the first cell is lower than an access threshold, signal quality of the second cell is higher than or equal to a reselection threshold, and the UE can receive a second indication message sent by the second cell, where the second indication message indicates that the second cell can control the UE to transmit the D2D service data on the second transmission carrier frequency; or the signal quality of the first cell is lower than an access threshold, signal quality of the second cell is higher than or equal to a reselection threshold, and the UE can receive a third indication message sent by the second cell, where the third indication message indicates that the second cell can control the UE to transmit the D2D service data on the third transmission carrier frequency.

With reference to the sixth possible implementation of the third aspect, in an eighth possible implementation of the third aspect, the first indication information further includes an access priority of a transmission carrier frequency used for transmitting the D2D service. The specified condition determined by the reselection module includes at least one of the following: signal quality of the second cell is higher than or equal to a reselection threshold, the UE can receive a third indication message sent by the second cell, and an access priority of the third transmission carrier frequency is higher than that of the second transmission carrier frequency, where the third indication message indicates that the second cell can control the UE to transmit the D2D service data on the third transmission carrier frequency; or the signal quality of the first cell is lower than an access threshold, signal quality of the second cell is higher than or equal to a reselection threshold, the UE can receive a third indication message sent by the second cell, and an access priority of the third transmission carrier frequency is higher than that of the second transmission carrier frequency, where the third indication message indicates that the second cell can control the UE to transmit the D2D service data on the third transmission carrier frequency.

With reference to the sixth possible implementation of the third aspect, in a ninth possible implementation of the third aspect, the first indication information further includes a cell reselection priority. The specified condition determined by the reselection module includes at least one of the following: signal quality of the second cell is higher than or equal to a reselection threshold, a reselection priority of the second cell is higher than or equal to that of the first cell, and the UE can receive a second indication message sent by the second cell, where the second indication message indicates that the second cell can control the UE to transmit the D2D service data on the second transmission carrier frequency; or signal quality of the second cell is higher than the signal quality of the first cell, a reselection priority of the second cell is higher than or equal to that of the first cell, and the UE can receive a second indication message sent by the second cell, where the second indication message indicates that the second cell can control the UE to transmit the D2D service data on the second transmission carrier frequency.

According to a fourth aspect, a device-to-device (D2D) service transmission apparatus is provided. The apparatus includes a sending module, configured to send first indication information using a first transmission carrier frequency. The first indication information indicates that the first cell can control UE to transmit D2D service data on a second transmission carrier frequency. The UE determines, according to the indication information, to use the first cell as a serving cell and transmit the D2D service data on the second transmission carrier frequency. The first transmission carrier frequency and the second transmission carrier frequency are located at different frequencies.

With reference to the fourth aspect, in a first possible implementation of the fourth aspect, the apparatus further includes an execution module, configured to: when it is determined that the UE transmits the D2D service data on the second transmission carrier frequency, allocate a D2D transmission resource on the second transmission carrier frequency to the UE.

With reference to the fourth aspect or the first possible implementation of the fourth aspect, in a second possible implementation of the fourth aspect, the sending module is configured to send the indication information by broadcasting system information; or send the first indication information using radio resource control RRC-specific control signaling.

With reference to any one of the fourth aspect or the first to the second possible implementations of the fourth aspect, in a third possible implementation of the fourth aspect, the apparatus further includes a first receiving module, configured to receive a request message sent by the UE. The request message includes frequency information of a transmission carrier frequency for a D2D service in which the UE is interested. The sending module is configured to send the first indication information according to the request message.

With reference to any one of the fourth aspect or the first to the third possible implementations of the fourth aspect, in a fourth possible implementation of the fourth aspect, the first indication information that is sent by the sending module using the first transmission carrier frequency includes frequency information of at least one second transmission carrier frequency.

With reference to the fourth possible implementation of the fourth aspect, in a fifth possible implementation of the fourth aspect, frequency information that is of the second transmission carrier frequency and that is in the first indication information sent by the sending module is included in the request message.

With reference to any one of the fourth aspect or the first to the fifth possible implementations of the fourth aspect, in a sixth possible implementation of the fourth aspect, the apparatus further includes a second receiving module, configured to receive a notification message that includes frequency information of the second transmission carrier frequency and that is sent by the UE. The notification message informs the first cell that the UE uses the second transmission carrier frequency as a transmission carrier frequency for transmitting the D2D service data.

According to a fifth aspect, a device-to-device (D2D) service transmission device is provided. The device includes a processor, configured to obtain signal quality of a first cell operating on a first transmission carrier frequency. The device also includes an interface, configured to receive first indication information sent by the first cell. The processor is further configured to, when it is determined that the signal quality of the first cell is higher than a preset threshold, and the first indication information sent by the first cell is received, select the first cell as a serving cell. The first indication information indicates that the first cell can control UE to transmit device-to-device D2D service data on a second transmission carrier frequency, and the first transmission carrier frequency and the second transmission carrier frequency are located at different frequencies. The processor is further configured to transmit the D2D service data on the second transmission carrier frequency.

With reference to the fifth aspect, in a first possible implementation of the fifth aspect, the interface is configured to receive the first indication information that is sent by the first cell by broadcasting system information; or receive the first indication information that is sent by the first cell by using radio resource control (RRC)-specific control signaling.

With reference to the fifth aspect or the first possible implementation of the fifth aspect, in a second possible implementation of the fifth aspect, the processor is further configured to send, to the first cell using the interface, a request message including frequency information of a transmission carrier frequency for a D2D service in which the UE is interested. The first cell sends the first indication information according to the request message.

With reference to any one of the fifth aspect or the first to the second possible implementations of the fifth aspect, in a third possible implementation of the fifth aspect, the first indication information received by the interface includes frequency information of a frequency of at least one second transmission carrier frequency.

With reference to the second or the third possible implementation of the fifth aspect, in a fourth possible implementation of the fifth aspect, a frequency of the second transmission carrier frequency selected by the processor is included in the request message.

With reference to any one of the fifth aspect or the first to the fourth possible implementations of the fifth aspect, in a fifth possible implementation of the fifth aspect, the interface is further configured to send, to the first cell, a notification message including frequency information of the second transmission carrier frequency. The notification message informs the first cell that the UE uses the second transmission carrier frequency as a transmission carrier frequency for transmitting the D2D service.

With reference to any one of the fifth aspect or the first to the third possible implementations of the fifth aspect, in a sixth possible implementation of the fifth aspect, the processor is further configured to: perform frequency scanning on a third transmission carrier frequency, to determine a second cell. When the second cell meets a specified condition, the processor is further configured to reselect the second cell as the serving cell. The processor is further configured to transmit D2D service data on a transmission carrier frequency that is used to execute a D2D service and that can be controlled by the second cell.

With reference to the sixth possible implementation of the fifth aspect, in a seventh possible implementation of the fifth aspect, the specified condition determined by the processor includes at least one of the following: signal quality of the second cell is higher than or equal to a reselection threshold, and the UE can receive a second indication message sent by the second cell, where the second indication message indicates that the second cell can control the UE to transmit the D2D service data on the second transmission carrier frequency; the signal quality of the first cell is lower than an access threshold, signal quality of the second cell is higher than or equal to a reselection threshold, and the UE can receive a second indication message sent by the second cell, where the second indication message indicates that the second cell can control the UE to transmit the D2D service data on the second transmission carrier frequency; or the signal quality of the first cell is lower than an access threshold, signal quality of the second cell is higher than or equal to a reselection threshold, and the UE can receive a third indication message sent by the second cell, where the third indication message indicates that the second cell can control the UE to transmit the D2D service data on the third transmission carrier frequency.

With reference to the sixth possible implementation of the fifth aspect, in an eighth possible implementation of the fifth aspect, the first indication information further includes an access priority of a transmission carrier frequency used for transmitting the D2D service. The specified condition determined by the processor includes at least one of the following: signal quality of the second cell is higher than or equal to a reselection threshold, the UE can receive a third indication message sent by the second cell, and an access priority of the third transmission carrier frequency is higher than that of the second transmission carrier frequency, where the third indication message indicates that the second cell can control the UE to transmit the D2D service data on the third transmission carrier frequency; or the signal quality of the first cell is lower than an access threshold, signal quality of the second cell is higher than or equal to a reselection threshold, the UE can receive a third indication message sent by the second cell, and an access priority of the third transmission carrier frequency is higher than that of the second transmission carrier frequency, where the third indication message indicates that the second cell can control the UE to transmit the D2D service data on the third transmission carrier frequency.

With reference to the sixth possible implementation of the fifth aspect, in a ninth possible implementation of the fifth aspect, the first indication information further includes a cell reselection priority; and the specified condition determined by the processor includes at least one of the following: signal quality of the second cell is higher than or equal to a reselection threshold, a reselection priority of the second cell is higher than or equal to that of the first cell, and the UE can receive a second indication message sent by the second cell, where the second indication message indicates that the second cell can control the UE to transmit the D2D service data on the second transmission carrier frequency; or signal quality of the second cell is higher than the signal quality of the first cell, a reselection priority of the second cell is higher than or equal to that of the first cell, and the UE can receive a second indication message sent by the second cell, where the second indication message indicates that the second cell can control the UE to transmit the D2D service data on the second transmission carrier frequency.

According to a sixth aspect, a device-to-device (D2D) service transmission device is provided. The device includes a processor and an interface. The processor is configured to send first indication information based on a first transmission carrier frequency using the interface. The first indication information indicates that the first cell can control UE to transmit device-to-device (D2D) service data on a second transmission carrier frequency. The UE determines, according to the indication information, to use the first cell as a serving cell and transmit the D2D service data on the second transmission carrier frequency. The first transmission carrier frequency and the second transmission carrier frequency are located at different frequencies.

With reference to the sixth aspect, in a first possible implementation of the sixth aspect, the processor is further configured to: when it is determined that the UE transmits the D2D service data on the second transmission carrier frequency, allocate a D2D transmission resource on the second transmission carrier frequency to the UE.

With reference to the sixth aspect or the first possible implementation of the sixth aspect, in a second possible implementation of the sixth aspect, the interface is configured to send the indication information by broadcasting system information; or send he first indication information using radio resource control (RRC)-specific control signaling.

With reference to any one of the sixth aspect or the first to the second possible implementations of the sixth aspect, in a third possible implementation of the sixth aspect, the interface may be further configured to receive a request message sent by the UE. The request message includes frequency information of a transmission carrier frequency for a D2D service in which the UE is interested; and send the first indication information according to the request message.

With reference to any one of the sixth aspect or the first to the third possible implementations of the sixth aspect, in a fourth possible implementation of the sixth aspect, the first indication information that is sent based on the first transmission carrier frequency by using the interface includes frequency information of at least one second transmission carrier frequency.

With reference to the fourth possible implementation of the sixth aspect, in a fifth possible implementation of the sixth aspect, the frequency information that is of the second transmission carrier frequency and that is in the first indication information sent by the interface is included in the request message.

With reference to any one of the sixth aspect or the first to the fifth possible implementations of the sixth aspect, in a sixth possible implementation of the sixth aspect, the interface is further configured to receive a notification message that includes the frequency information of the second transmission carrier frequency and that is sent by the UE. The notification message informs the first cell that the UE uses the second transmission carrier frequency as a transmission carrier frequency for transmitting the D2D service data.

According to the foregoing technical solutions, the UE obtains the signal quality of the first cell operating on the first transmission carrier frequency. When the UE determines that the signal quality of the first cell is higher than the preset threshold, and the UE receives the first indication information sent by the first cell, the UE selects the first cell as the serving cell, and transmits the D2D service data on the second transmission carrier frequency. By receiving the first indication information, the UE can select a transmission carrier frequency located at a different frequency to transmit the D2D service, so as to resolve a problem that the terminal cannot select a transmission carrier frequency located at a different frequency to transmit the D2D service data.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Usually, a terminal cannot select a transmission carrier frequency located at a different frequency to transmit D2D service data. In the technical solutions proposed in embodiments of the present invention, UE obtains signal quality of a first cell operating on a first transmission carrier frequency. When the UE determines that the signal quality of the first cell is higher than a preset threshold, and the UE receives first indication information sent by the first cell, the UE selects the first cell as a serving cell, and transmits the D2D service data on a second transmission carrier frequency. By receiving the first indication information, the UE can select a transmission carrier frequency located at a different frequency to transmit a D2D service, so as to resolve a problem that the terminal cannot select a transmission carrier frequency located at a different frequency to transmit the D2D service data.

The following describes, in detail with reference to the accompanying drawings, main implementation principles and specific implementations of the technical solutions of the embodiments of the present invention, and corresponding achievable beneficial effects.

For ease of description, in the technical solutions proposed in the embodiments of the present invention, cells and transmission carrier frequencies are distinguished, for example, respectively as a first cell and a second cell, and a first transmission carrier frequency, a second transmission carrier frequency and a third transmission carrier frequency. Correspondingly, for a terminal side, user terminals (user equipment, UE) are distinguished as first UE and second UE, respectively.

According to a D2D service transmission method proposed in embodiments of the present invention, the UE obtains the signal quality of the first cell operating on the first transmission carrier frequency. When the UE determines that the signal quality of the first cell is higher than the preset threshold, and the UE receives the first indication information sent by the first cell, the UE selects the first cell as the serving cell, and transmits the D2D service data on the second transmission carrier frequency.

The first indication information indicates that the first cell can control the UE to transmit the D2D service data on the second transmission carrier frequency. The first transmission carrier frequency and the second transmission carrier frequency are located at different frequencies.

The following describes, in detail with reference to the accompanying drawings, the main implementation principles and the specific implementations of the technical solutions of the embodiments of the present invention, and the corresponding achievable beneficial effects.

Embodiment 1

Figure 1:
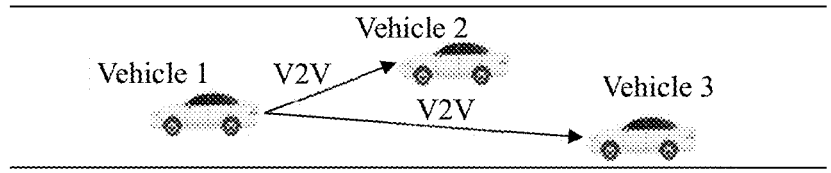
FIG. 1 is a schematic diagram of V2V communication in accordance with embodiments of the present invention.
Figure 2A:
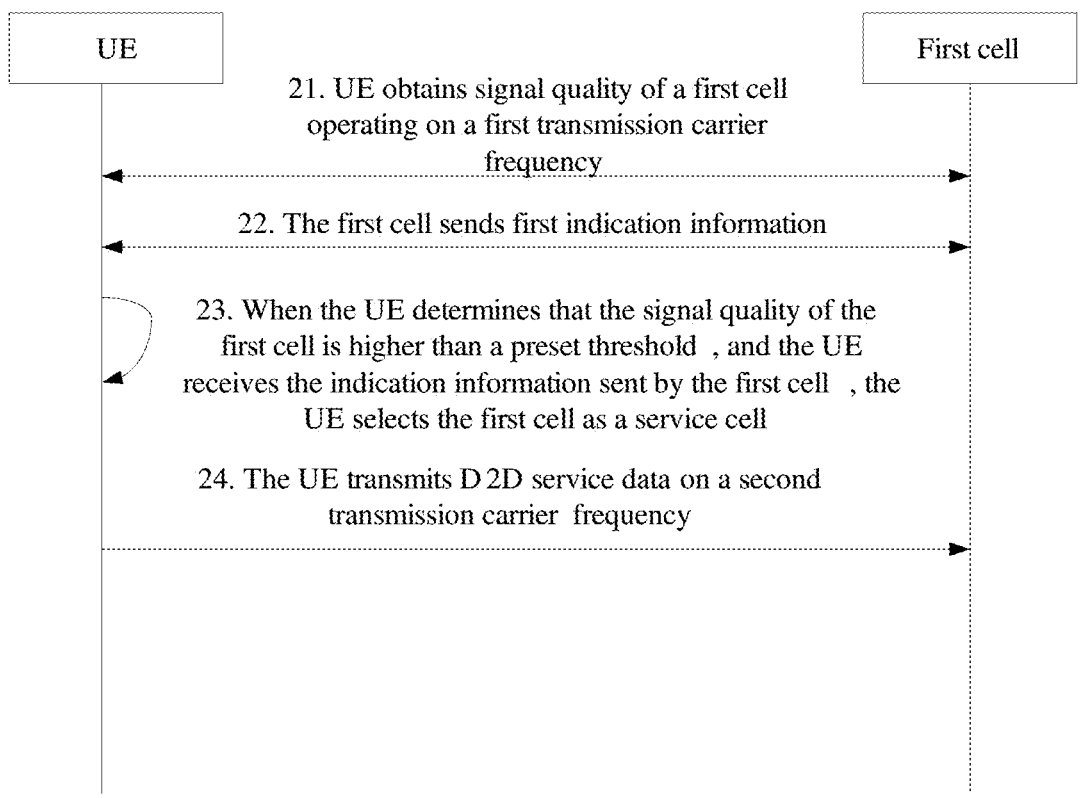
FIG. 2*a* is a flowchart of a D2D service transmission method proposed in Embodiment 1 of the present invention.

Embodiment 1 of the present invention provides a D2D service transmission method. As shown in FIG. 2*a*, a specific processing procedure of the method is described as follows.

Step 21: UE obtains signal quality of a first cell operating on a first transmission carrier frequency.

The UE measures signal quality of a cell, to obtain the signal quality of the first cell operating on the first transmission carrier frequency.

Step 22: The first cell sends first indication information.

There is no fixed time sequence between step 22 and step 21. The first cell may send the first indication information periodically or in a scheduled manner, or send the first indication information at any time. For ease of description, in the technical solution proposed in Embodiment 1 of the present invention, step 22 is performed after step 21.

The first cell may send the first indication information in the following two manners.

In a first manner, the first cell sends the first indication information by broadcasting system information.

In a second manner, the first cell sends the first indication information using RRC-specific control signaling.

The first indication information indicates that the first cell can control the UE to transmit D2D service data on a second transmission carrier frequency. The first transmission carrier frequency and the second transmission carrier frequency are located at different frequencies.

Optionally, before the first cell sends the first indication information in step 22, the method further includes the following step.

The UE sends, to the first cell, a request message including frequency information of a transmission carrier frequency for a D2D service in which the UE is interested. The first cell sends the first indication information according to the received request message.

Specifically, frequency information that is of the second transmission carrier frequency and that is in the first indication information sent by the first cell is included in the request message.

Step 23: When the UE determines that the signal quality of the first cell is higher than a preset threshold, and the UE receives the indication information sent by the first cell, the UE selects the first cell as a serving cell.

Correspondingly, the UE may receive, in the following two manners, the first indication information sent by the first cell:

In a first manner, the UE receives the first indication information that is sent by the first cell by broadcasting the system information.

In a second manner, the UE receives the first indication information that is sent by the first cell using the RRC-specific control signaling.

The UE selects the first cell as the serving cell, and the serving cell is a cell that can provide a D2D service.

Optionally, the first indication information includes a frequency of at least one second transmission carrier frequency.

Step 24: The UE transmits D2D service data on a second transmission carrier frequency.

An LTE-based V2V communication scenario is used as an example for detailed description.

The UE receives, using the first transmission carrier frequency, the indication information sent by the first cell. The UE determines that the first cell can control V2V service transmission on the second transmission carrier frequency. The UE measures the signal quality of the first cell, and determines, according to a measurement result, whether the signal quality of the first cell is higher than or equal to the preset threshold. If a determining result indicates that the signal quality of the first cell is higher than or equal to the preset threshold, the UE accesses and camps on the first cell. That is, the UE selects the first cell as the serving cell. The UE uses the second transmission carrier frequency indicated by the indication information as a transmission carrier frequency for carrying a V2V service.

In the LTE-based V2V communication scenario, the transmission carrier frequency for transmitting the V2V service and an LTE control carrier frequency are located at two different frequencies. An existing mechanism for cell selection in a D2D service does not support resource allocation for a V2V-specific transmission carrier frequency by using the LTE control carrier frequency. Based on this, in the technical solution proposed in Embodiment 1 of the present invention, the first cell operating on the first transmission carrier frequency sends the indication information. When the UE determines, according to the received indication information, that the signal quality of the first cell is higher than the preset threshold, the UE selects the first cell as the serving cell, and transmits the V2V service on the second transmission carrier frequency.

Optionally, after step 24, the method may further include the following step.

The UE sets a D2D service coverage identifier to a valid value.

In this case, the UE sets a D2D service coverage identifier of the UE to in-coverage. When being used as a synchronization source on the second transmission carrier frequency to send a synchronization signal, the UE may have a higher synchronization source priority if the D2D service coverage identifier is set to in-coverage.

After the UE uses the first cell as the serving cell, the UE is not always still. Therefore, as the UE moves, the UE may detect a second cell whose signal quality is higher than that of the first cell, or the UE expects to transmit a D2D service using another transmission carrier frequency. In this case, the UE needs to perform cell reselection.

Therefore, after the UE transmits the D2D service data on the second transmission carrier frequency in step 24, the method may further include the following step.

The UE reselects a second cell for access.

The UE performs frequency scanning on a third transmission carrier frequency, to determine the second cell. When the second cell meets a specified condition, the UE reselects the second cell as the serving cell. The UE transmits D2D service data on a transmission carrier frequency that is used to execute a D2D service and that can be controlled by the second cell.

The specified condition includes at least one of the following.

Condition 1: Signal quality of the second cell is higher than or equal to a reselection threshold, and the UE can receive a second indication message sent by the second cell. The second indication message indicates that the second cell can control the UE to transmit the D2D service data on the second transmission carrier frequency.

Condition 2: The signal quality of the first cell is lower than an access threshold, signal quality of the second cell is higher than or equal to a reselection threshold, and the UE can receive a second indication message sent by the second cell. The second indication message indicates that the second cell can control the UE to transmit the D2D service data on the second transmission carrier frequency.

Condition 3: The signal quality of the first cell is lower than an access threshold, signal quality of the second cell is higher than or equal to a reselection threshold, and the UE can receive a third indication message sent by the second cell. The third indication message indicates that the second cell can control the UE to transmit the D2D service data on the third transmission carrier frequency.

The first indication information further includes an access priority of a transmission carrier frequency used for transmitting the D2D service. In this scenario, the specified condition includes at least one of the following.

Condition 1: Signal quality of the second cell is higher than or equal to a reselection threshold, the UE can receive a third indication message sent by the second cell, and an access priority of the third transmission carrier frequency is higher than that of the second transmission carrier frequency. The third indication message indicates that the second cell can control the UE to transmit the D2D service data on the third transmission carrier frequency.

Condition 2: The signal quality of the first cell is lower than an access threshold, signal quality of the second cell is higher than or equal to a reselection threshold, the UE can receive a third indication message sent by the second cell, and an access priority of the third transmission carrier frequency is higher than that of the second transmission carrier frequency. The third indication message indicates that the second cell can control the UE to transmit the D2D service data on the third transmission carrier frequency.

The first indication information further includes a cell reselection priority.

In this scenario, the specified condition includes at least one of the following.

Condition 1: Signal quality of the second cell is higher than or equal to a reselection threshold, a reselection priority of the second cell is higher than or equal to that of the first cell, and the UE can receive a second indication message sent by the second cell. The second indication message indicates that the second cell can control the UE to transmit the D2D service data on the second transmission carrier frequency.

Condition 2: Signal quality of the second cell is higher than the signal quality of the first cell, a reselection priority of the second cell is higher than or equal to that of the first cell, and the UE can receive a second indication message sent by the second cell. The second indication message indicates that the second cell can control the UE to transmit the D2D service data on the second transmission carrier frequency.

According to the technical solution proposed in Embodiment 1 of the present invention, the UE obtains the signal quality of the first cell operating on the first transmission carrier frequency. When the UE determines that the signal quality of the first cell is higher than the preset threshold, and the UE receives the first indication information sent by the first cell, the UE selects the first cell as the serving cell, and transmits the D2D service data on the second transmission carrier frequency. By receiving the first indication information, the UE can select a transmission carrier frequency located at a different frequency to transmit the D2D service, so as to resolve a problem that the terminal cannot select a transmission carrier frequency located at a different frequency to transmit the D2D service data.

Embodiment 2

Figure 2B:
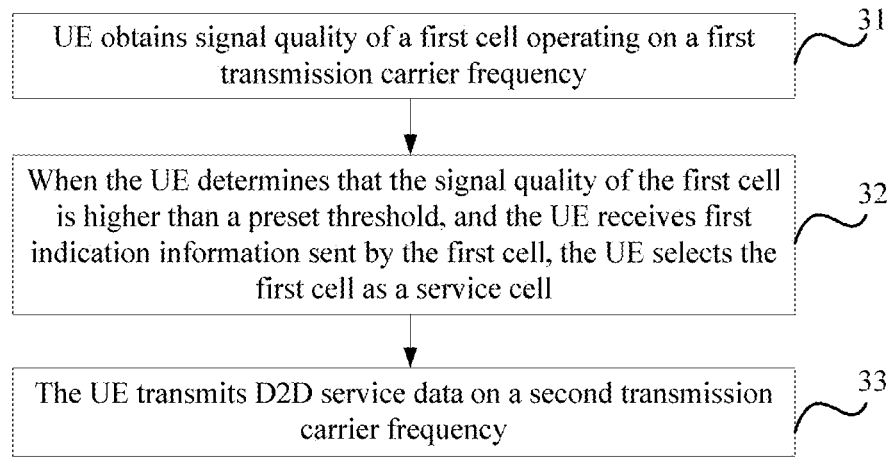
FIG. 2*b* is a flowchart of a D2D service transmission method proposed in Embodiment 2 of the present invention.

Embodiment 2 of the present invention provides a D2D service transmission method. As shown in FIG. 2b, a specific processing procedure of the method is described as follows.

Step 31: UE obtains signal quality of a first cell operating on a first transmission carrier frequency.

The UE measures signal quality of a cell, to obtain the signal quality of the first cell operating on the first transmission carrier frequency.

Step 32: When the UE determines that the signal quality of the first cell is higher than a preset threshold, and the UE receives first indication information sent by the first cell, the UE selects the first cell as a serving cell.

The first indication information indicates that the first cell can control the UE to transmit D2D service data on a second transmission carrier frequency, and the first transmission carrier frequency and the second transmission carrier frequency are located at different frequencies.

The UE may receive, in the following two manners, the first indication information sent by the first cell:

In a first manner, the UE receives the first indication information that is sent by the first cell by broadcasting system information.

In a second manner, the UE receives the first indication information that is sent by the first cell by using RRC-specific control signaling.

Step 33: The UE transmits D2D service data on a second transmission carrier frequency.

An LTE-based V2V communication scenario is used as an example for detailed description.

The UE receives, using the first transmission carrier frequency, the indication information sent by the first cell, determines that the first cell can control V2V service transmission on the second transmission carrier frequency, measures the signal quality of the first cell, and determines, according to a measurement result, whether the signal quality of the first cell is higher than or equal to the preset threshold. If a determining result indicates that the signal quality of the first cell is higher than or equal to the preset threshold, the UE accesses and camps on the first cell. That is, the UE selects the first cell as the serving cell. The UE uses the second transmission carrier frequency indicated by the indication information as a transmission carrier frequency for carrying a V2V service.

In the LTE-based V2V communication scenario, the transmission carrier frequency for transmitting the V2V service and an LTE control carrier frequency are located at two different frequencies. An existing mechanism for cell selection in a D2D service does not support resource allocation for a V2V-specific transmission carrier frequency using the LTE control carrier frequency. Based on this, in the technical solution proposed in Embodiment 2 of the present invention, the first cell operating on the first transmission carrier frequency sends the indication information. When the UE determines, according to the received indication information, that the signal quality of the first cell is higher than the preset threshold, the UE selects the first cell as the serving cell, and transmits the V2V service on the second transmission carrier frequency.

Optionally, before the UE receives the first indication information sent by the first cell, the method further includes the following step.

The UE sends, to the first cell, a request message including frequency information of a transmission carrier frequency for a D2D service in which the UE is interested. The first cell sends the first indication information according to the request message.

In an embodiment, the first indication information includes frequency information of a frequency of at least one second transmission carrier frequency.

In an embodiment, frequency information that is of the second transmission carrier frequency and that is in the first indication information sent by the first cell is included in the request message.

After the UE transmits the D2D service on the second transmission carrier frequency, the method further includes the following step.

The UE sends, to the first cell, a notification message including frequency information of the second transmission carrier frequency. The notification message informs the first cell that the UE uses the second transmission carrier frequency as a transmission carrier frequency for transmitting the D2D service.

After the UE uses the first cell as the serving cell, the UE is not always still. Therefore, as the UE moves, the UE may detect a second cell whose signal quality is higher than that of the first cell, or the UE expects to transmit a D2D service using another transmission carrier frequency. In this case, the UE needs to perform cell reselection.

Therefore, after the UE transmits the D2D service data on the second transmission carrier frequency, the method may further include the following step.

The UE reselects a second cell for access.

The UE performs frequency scanning on a third transmission carrier frequency, to determine the second cell. When the second cell meets a specified condition, the UE reselects the second cell as the serving cell. The UE transmits D2D service data on a transmission carrier frequency that is used to execute a D2D service and that can be controlled by the second cell.

The specified condition includes at least one of the following.

Condition 1: Signal quality of the second cell is higher than or equal to a reselection threshold, and the UE can receive a second indication message sent by the second cell, where the second indication message indicates that the second cell can control the UE to transmit the D2D service data on the second transmission carrier frequency.

Condition 2: The signal quality of the first cell is lower than an access threshold, signal quality of the second cell is higher than or equal to a reselection threshold, and the UE can receive a second indication message sent by the second cell, where the second indication message indicates that the second cell can control the UE to transmit the D2D service data on the second transmission carrier frequency.

Condition 3: The signal quality of the first cell is lower than an access threshold, signal quality of the second cell is higher than or equal to a reselection threshold, and the UE can receive a third indication message sent by the second cell, where the third indication message indicates that the second cell can control the UE to transmit the D2D service data on the third transmission carrier frequency.

The first indication information further includes an access priority of a transmission carrier frequency used for transmitting the D2D service. In this scenario, the specified condition includes at least one of the following.

Condition 1: Signal quality of the second cell is higher than or equal to a reselection threshold, the UE can receive a third indication message sent by the second cell, and an access priority of the third transmission carrier frequency is higher than that of the second transmission carrier frequency. The third indication message indicates that the second cell can control the UE to transmit the D2D service data on the third transmission carrier frequency.

Condition 2: The signal quality of the first cell is lower than an access threshold, signal quality of the second cell is higher than or equal to a reselection threshold, the UE can receive a third indication message sent by the second cell, and an access priority of the third transmission carrier frequency is higher than that of the second transmission carrier frequency. The third indication message indicates that the second cell can control the UE to transmit the D2D service data on the third transmission carrier frequency.

The first indication information further includes a cell reselection priority.

In this scenario, the specified condition includes at least one of the following.

Condition 1: Signal quality of the second cell is higher than or equal to a reselection threshold, a reselection priority of the second cell is higher than or equal to that of the first cell, and the UE can receive a second indication message sent by the second cell. The second indication message indicates that the second cell can control the UE to transmit the D2D service data on the second transmission carrier frequency.

Condition 2: Signal quality of the second cell is higher than the signal quality of the first cell, a reselection priority of the second cell is higher than or equal to that of the first cell, and the UE can receive a second indication message sent by the second cell. The second indication message indicates that the second cell can control the UE to transmit the D2D service data on the second transmission carrier frequency.

Figure 3:
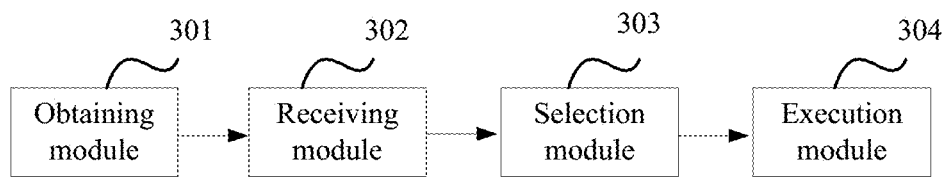
FIG. 3 is a schematic structural diagram of a D2D service transmission apparatus proposed in Embodiment 2 of the present invention.

Correspondingly, Embodiment 2 of the present invention further provides a D2D service transmission apparatus. As shown in FIG. 3, the apparatus includes an obtaining module 301, a receiving module 302, a selection module 303, and an execution module 304.

The obtaining module 301 is configured to obtain signal quality of a first cell operating on a first transmission carrier frequency.

The receiving module 302 is configured to receive first indication information sent by the first cell.

The selection module 303 is configured to: when it is determined that the signal quality of the first cell is higher than a preset threshold, and the first indication information sent by the first cell is received, select the first cell as a serving cell, where the first indication information indicates that the first cell can control UE to transmit device-to-device D2D service data on a second transmission carrier frequency. The first transmission carrier frequency and the second transmission carrier frequency are located at different frequencies.

The execution module 304 is configured to transmit the D2D service data on the second transmission carrier frequency.

Specifically, the receiving module 302 is specifically configured to receive the first indication information that is sent by the first cell by broadcasting system information; or receive the first indication information that is sent by the first cell using radio resource control RRC-specific control signaling.

The apparatus further includes a first sending module, configured to send, to the first cell, a request message including frequency information of a transmission carrier frequency for a D2D service in which the UE is interested. The first cell sends the first indication information according to the request message.

Specifically, the first indication information received by the receiving module includes frequency information of a frequency of at least one second transmission carrier frequency.

Specifically, a frequency of the second transmission carrier frequency selected by the selection module is included in the request message.

The apparatus further includes a second sending module, configured to send, to the first cell, a notification message including frequency information of the second transmission carrier frequency. The notification message informs the first cell that the UE uses the second transmission carrier frequency as a transmission carrier frequency for transmitting the D2D service.

The apparatus further includes: a determining module, configured to perform frequency scanning on a third transmission carrier frequency, to determine a second cell. The apparatus further includes a reselection module, configured to: when the second cell meets a specified condition, reselect the second cell as the serving cell. The apparatus further includes a transmission module, configured to transmit D2D service data on a transmission carrier frequency that is used to execute a D2D service and that can be controlled by the second cell.

Specifically, the specified condition determined by the reselection module includes at least one of the following: signal quality of the second cell is higher than or equal to a reselection threshold, and the UE can receive a second indication message sent by the second cell, where the second indication message indicates that the second cell can control the UE to transmit the D2D service data on the second transmission carrier frequency; the signal quality of the first cell is lower than an access threshold, signal quality of the second cell is higher than or equal to a reselection threshold, and the UE can receive a second indication message sent by the second cell, where the second indication message indicates that the second cell can control the UE to transmit the D2D service data on the second transmission carrier frequency; or the signal quality of the first cell is lower than an access threshold, signal quality of the second cell is higher than or equal to a reselection threshold, and the UE can receive a third indication message sent by the second cell, where the third indication message indicates that the second cell can control the UE to transmit the D2D service data on the third transmission carrier frequency.

The first indication information further includes an access priority of a transmission carrier frequency used for transmitting the D2D service. The specified condition determined by the reselection module includes at least one of the following: signal quality of the second cell is higher than or equal to a reselection threshold, the UE can receive a third indication message sent by the second cell, and an access priority of the third transmission carrier frequency is higher than that of the second transmission carrier frequency, where the third indication message indicates that the second cell can control the UE to transmit the D2D service data on the third transmission carrier frequency; or the signal quality of the first cell is lower than an access threshold, signal quality of the second cell is higher than or equal to a reselection threshold, the UE can receive a third indication message sent by the second cell, and an access priority of the third transmission carrier frequency is higher than that of the second transmission carrier frequency, where the third indication message indicates that the second cell can control the UE to transmit the D2D service data on the third transmission carrier frequency.

The first indication information further includes a cell reselection priority. The specified condition determined by the reselection module includes at least one of the following: signal quality of the second cell is higher than or equal to a reselection threshold, a reselection priority of the second cell is higher than or equal to that of the first cell, and the UE can receive a second indication message sent by the second cell, where the second indication message indicates that the second cell can control the UE to transmit the D2D service data on the second transmission carrier frequency; or signal quality of the second cell is higher than the signal quality of the first cell, a reselection priority of the second cell is higher than or equal to that of the first cell, and the UE can receive a second indication message sent by the second cell, where the second indication message indicates that the second cell can control the UE to transmit the D2D service data on the second transmission carrier frequency.

Figure 4:
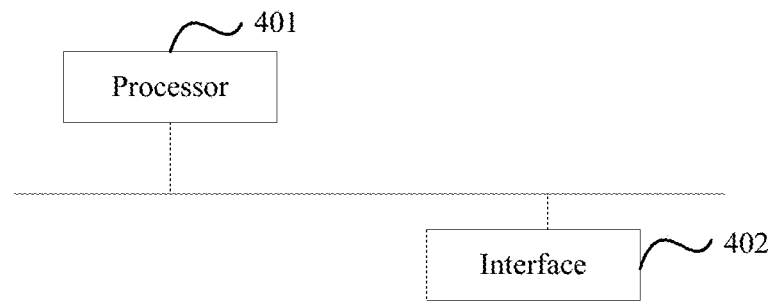
FIG. 4 is a schematic structural diagram of a D2D service transmission device proposed in Embodiment 2 of the present invention.

Correspondingly, Embodiment 2 of the present invention further provides a D2D service transmission device. As shown in FIG. 4, the device includes a processor, an interface, and a bus, and the processor and the interface are connected to each other by using the bus.

The processor 401 is configured to obtain signal quality of a first cell operating on a first transmission carrier frequency.

The processor may be a central processing unit (CPU), or a combination of a CPU and a hardware chip. A signal processor may alternatively be a network processor (NP), a combination of a CPU and an NP, or a combination of an NP and a hardware chip.

The hardware chip may be one or a combination of the following: an application-specific integrated circuit (ASIC), a field-programmable gate array (FPGA), or a complex programmable logic device (CPLD).

The interface 402 is configured to receive first indication information sent by the first cell.

The interface may be one or more of the following: a network interface controller (NIC) providing a wired interface, such as an Ethernet NIC, where the Ethernet NIC can provide a copper interface and/or a fiber interface; or an NIC providing a wireless interface, such as a wireless local area network (WLAN) NIC.

The processor 401 is configured to: when it is determined that the signal quality of the first cell is higher than a preset threshold, and the first indication information sent by the first cell is received, select the first cell as a serving cell. The first indication information indicates that the first cell can control UE to transmit device-to-device D2D service data on a second transmission carrier frequency, and the first transmission carrier frequency and the second transmission carrier frequency are located at different frequencies. The processor is also configured to transmit the D2D service data on the second transmission carrier frequency.

Specifically, the interface is configured to receive the first indication information that is sent by the first cell by broadcasting system information; or receive the first indication information that is sent by the first cell by using radio resource control (RRC)-specific control signaling.

Specifically, the processor is further configured to send, to the first cell using the interface, a request message including frequency information of a transmission carrier frequency for a D2D service in which the UE is interested. The first cell sends the first indication information according to the request message.

Specifically, the first indication information received by the interface includes frequency information of a frequency of at least one second transmission carrier frequency.

Specifically, a frequency of the second transmission carrier frequency selected by the processor is included in the request message.

Specifically, the interface is further configured to send, to the first cell, a notification message including frequency information of the second transmission carrier frequency. The notification message informs the first cell that the UE uses the second transmission carrier frequency as a transmission carrier frequency for transmitting the D2D service.

Specifically, the processor is further configured to: perform frequency scanning on a third transmission carrier frequency, to determine the second cell; when the second cell meets a specified condition, reselect the second cell as the serving cell; and transmit D2D service data on a transmission carrier frequency that is used to execute a D2D service and that can be controlled by the second cell.

Specifically, the specified condition determined by the processor includes at least one of the following: signal quality of the second cell is higher than or equal to a reselection threshold, and the UE can receive a second indication message sent by the second cell, where the second indication message indicates that the second cell can control the UE to transmit the D2D service data on the second transmission carrier frequency; the signal quality of the first cell is lower than an access threshold, signal quality of the second cell is higher than or equal to a reselection threshold, and the UE can receive a second indication message sent by the second cell, where the second indication message indicates that the second cell can control the UE to transmit the D2D service data on the second transmission carrier frequency; or the signal quality of the first cell is lower than an access threshold, signal quality of the second cell is higher than or equal to a reselection threshold, and the UE can receive a third indication message sent by the second cell, where the third indication message indicates that the second cell can control the UE to transmit the D2D service data on the third transmission carrier frequency.

In an embodiment, the first indication information further includes an access priority of a transmission carrier frequency used for transmitting the D2D service. The specified condition determined by the processor includes at least one of the following: signal quality of the second cell is higher than or equal to a reselection threshold, the UE can receive a third indication message sent by the second cell, and an access priority of the third transmission carrier frequency is higher than that of the second transmission carrier frequency, where the third indication message indicates that the second cell can control the UE to transmit the D2D service data on the third transmission carrier frequency; or the signal quality of the first cell is lower than an access threshold, signal quality of the second cell is higher than or equal to a reselection threshold, the UE can receive a third indication message sent by the second cell, and an access priority of the third transmission carrier frequency is higher than that of the second transmission carrier frequency, where the third indication message indicates that the second cell can control the UE to transmit the D2D service data on the third transmission carrier frequency.

The first indication information further includes a cell reselection priority. The specified condition determined by the processor includes at least one of the following: signal quality of the second cell is higher than or equal to a reselection threshold, a reselection priority of the second cell is higher than or equal to that of the first cell, and the UE can receive a second indication message sent by the second cell, where the second indication message indicates that the second cell can control the UE to transmit the D2D service data on the second transmission carrier frequency; or signal quality of the second cell is higher than the signal quality of the first cell, a reselection priority of the second cell is higher than or equal to that of the first cell, and the UE can receive a second indication message sent by the second cell, where the second indication message indicates that the second cell can control the UE to transmit the D2D service data on the second transmission carrier frequency.

Embodiment 3

Figure 5:
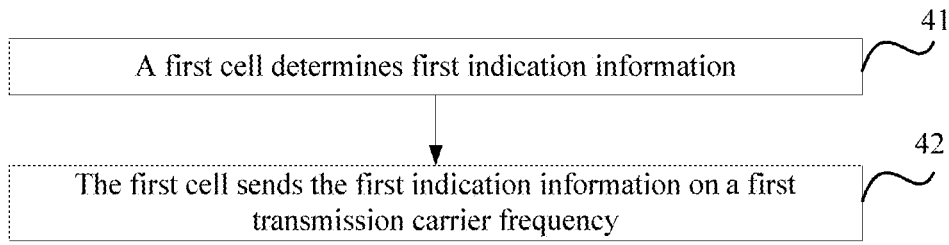
FIG. 5 is a flowchart of a D2D service transmission method proposed in Embodiment 3 of the present invention.
Figure 6:
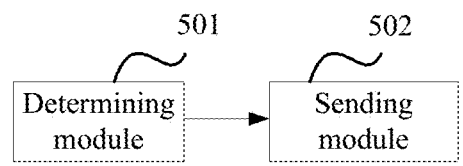
FIG. 6 is a schematic structural diagram of a D2D service transmission apparatus proposed in Embodiment 3 of the present invention.

Embodiment 3 of the present invention provides a D2D service transmission method. As shown in FIG. 5, a specific processing procedure of the method is described as follows.

Step 41: A first cell determines first indication information.

Step 42: The first cell sends the first indication information on a first transmission carrier frequency.

The first indication information indicates that the first cell can control UE to transmit device-to-device (D2D) service data on a second transmission carrier frequency. The UE determines, according to the indication information, to use the first cell as a serving cell and transmit the D2D service data on the second transmission carrier frequency.

The first cell may send the first indication information in the following two manners:

In a first manner, the first cell sends the first indication information by broadcasting system information.

In a second manner, the first cell sends the first indication information by using RRC-specific control signaling.

The first indication information indicates that the first cell can control the UE to transmit the D2D service data on the second transmission carrier frequency, and the first transmission carrier frequency and the second transmission carrier frequency are located at different frequencies.

The first transmission carrier frequency and the second transmission carrier frequency are located at different frequencies.

The method further includes the following step.

When the first cell determines that the UE transmits the D2D service data on the second transmission carrier frequency, the first cell allocates a D2D transmission resource on the second transmission carrier frequency to the UE.

That the first cell sends the first indication information using a first transmission carrier frequency includes: the first cell sends the indication information by broadcasting system information; or the first cell sends the first indication information using radio resource control (RRC)-specific control signaling.

Before the first cell sends the first indication information by using the first transmission carrier frequency, the method further includes the following step.

The first cell receives a request message sent by the UE, and the first cell sends the first indication information according to the request message.

The request message includes frequency information of a transmission carrier frequency for a D2D service in which the UE is interested.

The first indication information that is sent by the first cell using the first transmission carrier frequency includes frequency information of at least one second transmission carrier frequency.

Frequency information that is of the second transmission carrier frequency and that is in the first indication information sent by the first cell is included in the request message.

The method further includes the following step.

The first cell receives a notification message that includes the frequency information of the second transmission carrier frequency and that is sent by the UE. The notification message informs the first cell that the UE uses the second transmission carrier frequency as a transmission carrier frequency for transmitting the D2D service data.

Correspondingly, Embodiment 3 of the present invention further provides a D2D service transmission apparatus. As shown in FIG. 5, the apparatus includes a determining module 501 and a sending module 502.

The determining module 501 is configured to determine first indication information.

The sending module 502 is configured to send the first indication information by using a first transmission carrier frequency. The first indication information indicates that the first cell can control UE to transmit device-to-device (D2D) service data on a second transmission carrier frequency. The UE determines, according to the indication information, to use the first cell as a serving cell and transmit the D2D service data on the second transmission carrier frequency, where the first transmission carrier frequency and the second transmission carrier frequency are located at different frequencies.

The apparatus further includes: an execution module, configured to: when it is determined that the UE transmits the D2D service data on the second transmission carrier frequency, allocate a D2D transmission resource on the second transmission carrier frequency to the UE.

In an embodiment, the sending module is configured to send the indication information by broadcasting system information; or send the first indication information using radio resource control (RRC)-specific control signaling.

The apparatus further includes a first receiving module, configured to receive a request message sent by the UE. The request message includes frequency information of a transmission carrier frequency for a D2D service in which the UE is interested. The sending module is configured to send the first indication information according to the request message.

Specifically, the first indication information that is sent by the sending module using the first transmission carrier frequency includes frequency information of at least one second transmission carrier frequency.

In an embodiment, frequency information that is of the second transmission carrier frequency and that is in the first indication information sent by the sending module is included in the request message.

The apparatus further includes a second receiving module, configured to receive a notification message that includes the frequency information of the second transmission carrier frequency and that is sent by the UE. The notification message is used to inform the first cell that the UE uses the second transmission carrier frequency as a transmission carrier frequency for transmitting the D2D service data.

Correspondingly, Embodiment 3 of the present invention further provides a D2D service transmission device. For a schematic structural diagram of the device, refer to FIG. 4.

The device includes a processor and an interface, and the processor and the interface are connected to each other by using a bus.

The processor is configured to send first indication information based on a first transmission carrier frequency using the interface, where the first indication information indicates that the first cell can control UE to transmit device-to-device D2D service data on a second transmission carrier frequency. The UE determines, according to the indication information, to use the first cell as a serving cell and transmit the D2D service data on the second transmission carrier frequency, where the first transmission carrier frequency and the second transmission carrier frequency are located at different frequencies.

The processor is further configured to: when it is determined that the UE transmits the D2D service data on the second transmission carrier frequency, allocate a D2D transmission resource on the second transmission carrier frequency to the UE.

The interface is configured to send the indication information by broadcasting system information; or send the first indication information using radio resource control (RRC)-specific control signaling.

The interface may be further configured to receive a request message sent by the UE, where the request message includes frequency information of a transmission carrier frequency for a D2D service in which the UE is interested; and send the first indication information according to the request message.

The first indication information that is sent based on the first transmission carrier frequency using the interface includes frequency information of at least one second transmission carrier frequency.

The frequency information that is of the second transmission carrier frequency and that is in the first indication information sent by the interface is included in the request message.

The interface is further configured to receive a notification message that includes the frequency information of the second transmission carrier frequency and that is sent by the UE, where the notification message informs the first cell that the UE uses the second transmission carrier frequency as a transmission carrier frequency for transmitting the D2D service data.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk storage, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may alternatively be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of the claims and their equivalent technologies of the present invention.

What is claimed is:

1. A method, comprising:
obtaining, by user equipment (UE), signal quality of a first cell of a base station, wherein the first cell operates on a first transmission carrier frequency;
receiving, by the UE, first indication information of the first cell from the base station, wherein the first indication information of the first cell is usable by the UE in a cell selection process, the first indication information of the first cell indicates that the base station is capable of controlling the UE to transmit device-to-device (D2D) service data using a second transmission carrier frequency in the first cell, and the first transmission carrier frequency and the second transmission carrier frequency are different frequencies;
in response to determining that the signal quality of the first cell is higher than a preset threshold, and in response to determining, based on the first indication information of the first cell, that the base station is capable of controlling the UE to transmit D2D service data using the second transmission carrier frequency in the first cell, selecting, by the UE, the first cell as a serving cell; and
transmitting, by the UE in the first cell, the D2D service data using the second transmission carrier frequency.

2. The method according to claim 1, wherein the serving cell supports a D2D service.

3. The method according to claim 1, wherein the UE is a synchronization source on the second transmission carrier frequency, and the UE sets a coverage identifier of the UE to in-coverage.

4. The method according to claim 1, wherein the UE receiving first indication information of the first cell from the base station comprises:
receiving, by the UE, system information broadcast from the base station, wherein the first indication information of the first cell is included in the system information; or
receiving, by the UE, a radio resource control (RRC) specific control signaling from the base station, wherein the first indication information of the first cell is included in the RRC specific control signaling.

5. The method according to claim 1, wherein the first indication information of the first cell comprises frequency information of the second transmission carrier frequency.

6. A method, comprising:
determining, by a base station, first indication information of a first cell, wherein the first cell operates on a first transmission carrier frequency, and the first indication information of the first cell indicates that the base station is capable of controlling user equipment (UE) to transmit device-to-device (D2D) service data on a second transmission carrier frequency in the first cell;
sending, by the base station, the first indication information of the first cell to the UE, wherein the first indication information of the first cell is sent using the first transmission carrier frequency, and wherein the first transmission carrier frequency and the second transmission carrier frequency are different frequencies;
obtaining, by the UE, signal quality of the first cell;
receiving, by the UE, the first indication information of the first cell from the base station, wherein the first indication information of the first cell is usable by the UE in a cell selection process;
in response to determining that the signal quality of the first cell is higher than a preset threshold, and in response to determining, based on the first indication information of the first cell, that the base station is capable of controlling the UE to transmit D2D service data using the second transmission carrier frequency in the first cell, selecting, by the UE, the first cell as a serving cell; and
transmitting, by the UE in the first cell, the D2D service data using the second transmission carrier frequency.

7. The method according to claim 6, wherein the first cell supports a D2D service.

8. The method according to claim 6, wherein sending, by the base station, the first indication information of the first cell using the first transmission carrier frequency comprises:
broadcasting, by the base station, system information, wherein the first indication information of the first cell is included in the system information; or
sending, by the base station, a radio resource control (RRC) specific control signaling, wherein the first indication information of the first cell is included in the specific control signaling.

9. The method according to claim 6, wherein the first indication information of the first cell comprises frequency information of the second transmission carrier frequency.

10. An apparatus, comprising:
a processor, configured to obtain signal quality of a first cell of a base station, wherein the first cell operates on a first transmission carrier frequency; and
an interface, configured to receive first indication information of the first cell from the base station, wherein the first indication information of the first cell is usable by the apparatus in a cell selection process, wherein the first indication information of the first cell indicates that the base station is capable of controlling the apparatus to transmit device-to-device (D2D) service data on a second transmission carrier frequency in the first cell, and the first transmission carrier frequency and the second transmission carrier frequency are different frequencies;
wherein the processor is further configured to:
when it is determined the signal quality of the first cell is higher than a preset threshold, and it is determined, based on the first indication information of the first cell, that the base station is capable of controlling the apparatus to transmit D2D service data using the second transmission carrier frequency in the first cell, select the first cell as a serving cell; and
wherein the interface is further configured to transmit the D2D service data in the first cell on the second transmission carrier frequency.

11. The apparatus according to claim 10, wherein the serving cell supports the D2D service.

12. The apparatus according to claim 10, wherein the apparatus is a synchronization source on the second transmission carrier frequency, and the apparatus sets a coverage identifier of the apparatus to in-coverage.

13. The apparatus according to claim 10, wherein the interface is configured to:
receive system information, wherein the first indication information of the first cell is included in the system information; or
receive a radio resource control (RRC) specific control signaling, wherein the first indication information of the first cell is included in the specific control signaling.

14. The apparatus according to claim 10, wherein the first indication information of the first cell comprises frequency information of the second transmission carrier frequency.

15. A wireless communication system, comprising:
user equipment (UE); and
a base station, configured to:
determine first indication information of a first cell, wherein the first cell operates on a first transmission carrier frequency, the first indication information of the first cell indicates that the base station is capable of controlling the UE to transmit device-to-device (D2D) service data on a second transmission carrier frequency in the first cell; and
send the first indication information of the first cell on the first transmission carrier frequency using the interface, wherein the first transmission carrier frequency and the second transmission carrier frequency are different frequencies; and
the UE is configured to:
obtain signal quality of the first cell;
receive the first indication information of the first cell from the base station, wherein the first indication information of the first cell is usable by the UE in a cell selection process;
in response to determining that the signal quality of the first cell is higher than a preset threshold, and in response to determining, based on the first indication information of the first cell, that the base station is capable of controlling the UE to transmit D2D service data using the second transmission carrier frequency in the first cell, select the first cell as a serving cell; and transmit the D2D service data using the second transmission carrier frequency in the first cell.

16. The system according to claim 15, wherein the first cell supports a D2D service.

17. The system according to claim 15, wherein the base station is configured to:
broadcast system information, wherein the first indication information of the first cell is included in the system information; or
send a radio resource control (RRC) specific control signaling, wherein the first indication information of the first cell is included in the specific control signaling.

18. The system according to claim 15, wherein the first indication information of the first cell comprises frequency information of the second transmission carrier frequency.

* * * * *